United States Patent Office 3,706,577
Patented Dec. 19, 1972

3,706,577
SULFUR-CONTAINING FLAVORING COMPOSITIONS AND PROCESSES THEREFOR
Ira Katz, Elberon, William John Evers, Long Branch, and Christopher Giacino, Califon, N.J., assignors to International Flavors and Fragrances, Inc.
No Drawing. Filed Mar. 16, 1970, Ser. No. 20,148
Int. Cl. A23l *1/22, 1/26*
U.S. Cl. 99—140 R
14 Claims

ABSTRACT OF THE DISCLOSURE

Foodstuff, flavor augmenting and flavor imparting compositions are provided containing a quantity of bis-(thienyl) sulfide sufficient to alter the organoleptic characteristics of said composition.

---

The present invention relates in general to compositions useful in altering the organoleptic characteristics of a foodstuff. More particularly, this invention has to do with the use of bis-(thienyl) sulfides to alter the flavor of foodstuffs.

The term "alter" in its various forms is used herein to mean the supplying or imparting a flavor character or note to an otherwise bland, relatively tasteless substance, or augmenting an existing flavor characteristic where the natural flavor is deficient in some regard, or supplementing the existing flavor impression to modify its quality character or taste.

The term "foodstuff" as used herein includes both solid and liquid ingestible materials which usually do, but need not, have nutritional value. Thus, foodstuffs include meats, gravies, soups, convenience foods, beverages, dairy products, candies, vegetables, cereals, soft drinks, snacks and the like.

Reproduction of roasted and meat flavors and aroma has been the subject of a long and continuing search by those engaged in the production of foodstuff. The acute shortage of foods, especially protein foods, in many parts of the world has given rise to the need for utilizing non-meat sources of proteins and making such proteins as palatable and as meat-like as possible. Hence, materials which are capable of closely simulating or even exactly reproducing the flavor and aroma of roasted products and meat products are highly desirable, if not necessary.

In accordance with this invention, it has been found that novel foodstuff and flavoring compositions having desirable meat, roasted meat, etc., fragrance and flavor notes may be readily provided by the utilization of at least one compound comprising a bis-(thienyl) sulfide wherein the sulfide linkage contains from 2 to 4 sulfur atoms. Such compounds can be represented according to the following structural formula:

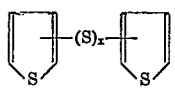

wherein X represents an integer of 2 to 4 inclusive.

It will be understood that the above-depicted bis-(thienyl) compounds may contain one or more C-bonded nuclear substituents, the salient requirement being that any such substituent be devoid of any tendency to deleteriously affect the functionality of the parent compound having reference to the ultimate environment contemplated, i.e., a foodstuff or flavoring composition. Thus, inert substituents of an innocuous nature such as lower alkyl containing from 1 to 5 carbon atoms may be present.

Thus, the bis-(thienyl) sulfide compounds contemplated for the use in the practice of the present invention can also, for convenience, be represented according to the following structural formula:

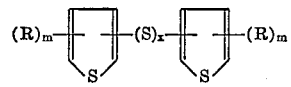

wherein X has the significance previously assigned, R represents hydrogen or lower alkyl containing from 1 to 5 carbon atoms and $m$ represents an integer of 1 to 3 inclusive.

The bis-(thienyl) sulfide compounds can be prepared according to procedures described in the art. One such method found to be particularly suitable involves the oxidation of the corresponding thiophene thiol, i.e., a compound of the formula:

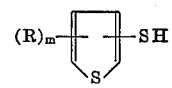

wherein R and $m$ have the aforedescribed significance, with the appropriate sulfur chloride at reduced temperature, e.g., within the range of —20 to —30° C., the reaction preferably being carried out in the presence of a suitable inert organic solvent, e.g., diethyl ether. The thiophene thiol is preferably employed in amounts sufficient to yield a mole ratio to sulfur chloride of at least about 2:1. Product isolation and recovery may thereafter be readily effected by any suitable separation technique such as extraction with organic solvent, e.g., a lower dialkyl ether.

Another method particularly applicable to the preparation of 2,2'- and 3,3'-bis-(thienyl) disulfide involves treatment of the corresponding thiophene thiol with a solution of iodine and potassium or sodium iodide in the presence of, for example, sodium carbonate, followed by ether extraction.

Other methods applicable to the preparation of the bis-(thienyl) sulfide derivatives of the present invention are described, for example, in U.S. Pats. 2,510,893 and 2,571,370 and The Chemistry of Heterocyclic Compounds, H. D. Hartough, "Thiophene and Its Derivatives," by A. Weissberger, Interscience Publishers, Inc., New York, 1952.

Particular examples of bis-(thienyl) sulfides suitable for use herein include, without necessary limitation, the following:

2,2'-bis-(thienyl) disulfide

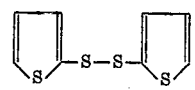

3,3'-bis-(thienyl) disulfide

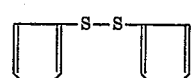

2,2'-bis-(thienyl) tetrasulfide

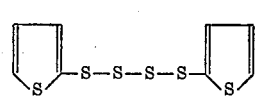

2,2'-bis-(thienyl) trisulfide

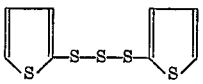

The bis-(thienyl) sulfides described herein may be employed either singly or in admixtures comprising two or more thereof in conjunction with a suitable flavoring adjuvant depending upon the type of product being prepared, i.e., foodstuff, flavoring composition, etc. Such a mode of proceeding offers the advantage that the beneficial aspects characterizing each of a plurality of such sulfide compounds may be exploited in a specific instance. In this manner, the formulator is afforded effective means to simulate a wide variety or organoleptic factors whereby to evoke a predetermined taste response on the part of the consumer. Thus, such compounds are capable of providing a meat-like flavor, e.g., roasted meat, having a slight oniony or garlic character with fatty green notes, and accordingly may be utilized in combination with other edible materials to impart a meaty or roasted meat organoleptic impression to foods or other edible materials ranging from beef through poultry, e.g., chicken. As a result of their pronounced roasted meat character, the bis-(thienyl) sulfides are beneficially adapted for use in the preparation of spices, nut flavors, e.g., peanuts and walnuts, as well as meats and gravies having, in addition, a mushroom flavor note. Such compounds are, in addition, particularly efficacious for purposes of imparting body and fullness to beef broth, for example.

The nature of the co-ingredients included with the bis-(thienyl) sulfide derivative in formulating the product composition will, of course, depend primarily upon the ultimate use contemplated, i.e., as a foodstuff per se or alternatively as a flavoring composition adapted to be added to a foodstuff at some subsequent point of time. In any event, such compounds serve to alter the organoleptic characteristics of the ultimate foodstuff treated therewith.

Substances suitable for use herein as co-ingredients or flavoring adjuvants are well known in the art for such use being extensively described in the relevant literature. Apart from the requirement that any such material be "ingestibly" acceptable, and thus non-toxic or otherwise non-deleterious, nothing particularly critical resides in the selection thereof. Accordingly, such materials, which may in general be characterized as flavoring adjuvants or vehicles comprise broadly, stabilizers, thickeners, surface active agents, conditioners, flavorants and flavor intensifiers.

Stabilizer compounds include preservatives, e.g., sodium chloride, antioxidants, e.g., calcium and sodium ascorbate, ascorbic acid, butylated hydroxyanisole (mixture of 2 and 3 tertiary butyl-4-hydroxyanisole), butylated hydroxy toluene (2,6-di-tertiary-butyl-4-methyl phenol), propyl gallate and the like, sequestrants, e.g., citric acid.

Thickener compounds include carriers, binders, protective colloids, suspending agents, emulsifiers and the like, e.g., agar-agar; carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches, pectins, and emulsifiers, e.g., mono- and diglycerides of fatty acids.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chloride, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, turmeric and curcunin and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferric pyrophosphate, ferrous gluconate and the like, riboflavin, vitamins, zinc sources such as zinc chloride, zinc sulfate and the like.

Flavorants and flavor intensifiers include organic acids, e.g., fatty saturated, unsaturated and amino acids; alcohols, e.g., primary and secondary alcohols; esters; carbonyl compounds including aldehydes and ketones, lactones; cyclic organic materials including benzene derivatives; alicyclics, heterocyclics such as furans, particularly 3-acetylfuran, pyridines, pyrazines and the like, sulfur-containing materials including thiols, sulfides, disulfides and the like; so-called flavor potentiators such as monosodium glutamate, guanylates, inosinates, natural and synthetic flavorants such as vanillin, natural gums and the like; spices, herbs, essential oils and extractives including anise, anise oil, alkanet root extract, bay leaves, capsicum extract and the like.

The specific flavoring adjuvant selected for use may be either solid or liquid, depending upon the desired physical form of the ultimate product, i.e., foodstuff, whether simulated or natural, and should, in any event, be capable of providing an environment in which the bis-(thienyl) sulfide can be dispersed or admixed to provide a homogenous medium. In addition, selection of one or more flavoring adjuvants as well as the quantities thereof will depend upon the precise organoleptic character desired in the finished product; thus, in the case of flavoring compositions, ingredient selection will vary in accordance with the foodstuff to which the flavor and aroma are to be imparted. In contra-distinction, in the preparation of solid products, e.g., simulated foodstuffs, ingredients capable of providing normally solid compositions should be selected such as various cellulose derivatives.

As will be appreciated by those skilled in the art, the amount of bis-(thienyl) sulfide employed in a particular instance can vary over a relatively wide range whereby to achieve desired organoleptic effects having reference to the nature of the product. Thus, correspondingly greater amounts would be necessary in those instances wherein the ultimate food composition to be flavored is relatively bland to the taste, whereas relatively minor quantities may suffice for purposes of enhancing a composition merely deficient in natural flavor or aroma. Thus, the primary requirement is that the amount selected be effective, i.e., sufficient to alter the organoleptic characteristics of the parent composition, whether foodstuff per se or flavoring composition. Thus, the use of insufficient quantities of the bis-(thienyl) sulfide material will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, it is found that effective quantities of the bis-(thienyl) sulfides range from about 1.0 part per billion to about 500 parts per million by weight based on total composition. Concentrations in excess of the maximum quantities stated are not normally recommended since they fail to provide commensurates enhancement of organoleptic properties. In those instances wherein the bis-(thienyl) sulfide is added to the foodstuff as an integral component of a flavoring composition, it is, of course, essential that the total quantity of flavoring composition employed be sufficient to yield an effective sulfide concentration in the foodstuff product.

Flavoring compositions prepared in accordance with the present invention preferably contain the bis-(thienyl) sulfide compound in concentrations ranging from about 0.001% to about 1% by weight, based on the total weight of said flavoring composition.

The compositions described herein can be prepared according to conventional techniques well known in the art for such purposes. Thus, liquid products can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the bis-(thienyl) sulfide compound with, for example, gum arabic, gum tragacanth, carageenan and the like, and thereafter, spray-drying the resultant mixture whereby to obtain the particulate solid product. Pre-prepared flavor mixes in powder form may be obtained by mixing the dried solid components and bis-(thienyl) sulfide material in a dry blender until the requisite degree of uniformity is achieved.

The following examples are given for purposes of illustration only and are not to be considered as necessarily constituting a limitation on the present invention. All parts and percentages given are by weight unless otherwise indicated.

EXAMPLE 1

Prepaartion of 2,2'-bis-(thienyl) tetrasulfide

To an Erlenmeyer flask equipped with a T-joint, calcium chloride drying tube and magnetic stirrer are charged 20 ml. of diethyl ether (anhydrous), 2.32 g. (0.02 mole) of 2-thiophene thiol and a small amount of solid sodium bicarbonate. The flask contents are cooled to $-20°$ C. with stirring. Thereupon, 1.35 g. (0.01 mole) of sulfur monochloride (redistilled) is added dropwise over a period of 5 minutes. At the end of this period, a color change from yellow orange to very pale yellow is observed. The mixture is stirred for 20 minutes at a temperature ranging from $-20$ to $-25°$ C. The reaction mixture, after pouring into 100 ml. of water, (a vigorous reaction attending such pouring), is neutralized to a pH of 7 with solid sodium bicarbonate, whereupon separate organic and aqueous layers form. The aqueous phase is extracted twice with 25 ml. of diethyl ether. After drying the bulked organic solutions over sodium sulfate, filtering and concentration, there is obtained 2.70 g. of a yellow-green oil. Column chromatography of the yellow-green oil on 81.0 g. of silicic acid in hexane yields three fractions weighing 0.6 g., 1.5 g. and 0.4 g., respectively. Mass spectral analysis establishes fraction 3 to be 2,2'-bis-(thienyl) tetrasulfide.

EXAMPLE 2

A 0.1% solution of 2,2'-bis-(thienyl) tetrasulfide, prepared as in Example 1, in propylene glycol is added in the amount of 0.001 g. to 22 g. of a soup base consisting of—

| Ingredient: | Amount (parts/100 total) |
|---|---|
| Fine ground sodium chloride | 7.0 |
| Hydrolyzed vegetable protein | 68.0 |
| Mono-sodium glutamate | 1.0 |
| Sucrose | 1.0 |
| Beef fat | 22.0 |
| Sethness caramel color (powder B & C) | 1.0 |

The resulting mixture is added to 35 oz. of boiling water to obtain a soup having an excellent meat flavor.

EXAMPLE 3

A small amount, 300 g. of the soup base mixture of Example 2 is emulsified in a solution containing 300 g. gum arabic and 500 g. water. The resultant emulsion is sprayed-dried with a Bowen Lab Model Drier utilizing 250 c.f.s. of air with an inlet temperature of 500° F., an outlet temperature of 200° F. and a wheel speed of 50,000 r.p.m. The sprayed-dried material is added in the amount of 11 g. to 11 g. of the soup base described in Example 2. The resulting mixture, upon addition to 35 oz. of boiling water, yields a soup having an excellent roasted-meat flavor.

EXAMPLE 4

Preparation of 3,3'-bis-(thienyl) disulfide

To a 500 ml. Erlenmeyer flask equipped with magnetic stirrer, stirring bar and addition funnel and containing the following solution:

| | | |
|---|---|---|
| Sodium carbonate | g | 2.75 |
| 3-thiophenethiol | g | 2.5 |
| Water | ml | 50.0 | is added dropwise a solution of iodine (3.0 g.), sodium iodide (9.0 g.) in 100 ml. of water until the color of iodine persists. Excess iodine is removed by careful addition of sodium thiosulfate solution (~0.1 N). The reaction mixture is extracted with ether (3× 100 ml.). After drying with anhydrous sodium sulfate, solvent removal yields 2.3 g. of a brown oil.

A 1.65 g. portion of this oil is chromatographed on 80.0 g. of silicic acid packed in hexane. The sample is applied to the column in a hexane:ether (99/1) mixture. Elution with 625 ml. of the same solvent followed by hexane:ether (98/2) mixture yields 1.31 g. of 3,3'-bis-(thienyl) disulfide as a yellow oil. The identity of the compound is confirmed by nuclear magnetic resonance and thin film infrared spectroscopy.

EXAMPLES 5 AND 6

Examples 2 and 3 are repeated except that in each instance the 2,2'-bis-(thienyl) tetrasulfide is replaced by an equivalent amount ofthe 3,3' - bis(thienyl) disulfide produced as in Example 4. In each case, soups having an excellent meat flavor or roasted meat flavor are obtained.

EXAMPLE 7

Preparation of 2,2-bis-(thienyl) disulfide

To a 500 ml. Erlenmeyer flask equipped with magnetic stirrer, stirring bar and addition funnel and containing the following solution:

| | | |
|---|---|---|
| Sodium carbonate | g | 5.5 |
| 2-thiophenethiol | g | 5.0 |
| Water | ml | 100 | is added a solution of iodine (6.0 g.) and potassium iodide (6.0 g.) in 150 ml. of water until the iodine, coloration persists. Excess iodine is removed by careful dropwise addition of sodium thiosulfate solution (~0.1 N). The reaction mixture is extracted with ether (3× 100 ml.). After drying with anhydrous sodium sulfate, solvent removal yields 2.3 g. of a brown oil.

A 1.65 g. portion of this oil is chromatographed on 80.0 g. of silicic acid packed in hexane. The sample is applied to the column in hexane: ether (99/1) mixture. Elution with 625 ml. of the same solvent followed by hexane:ether (98/2) mixture yields 1.31 g. of 2,2'-bis-(thienyl) disulfide. The identity of the compound is confirmed by nuclear magnetic resonance and thin film infrared spectroscopy.

EXAMPLES 8 AND 9

Examples 2 and 3 are repeated except that in each instance, the 2,2'-bis-(thienyl) tetrasulfide is replaced by an equivalent amount of the 2,2'-bis-(thienyl) disulfide produced as in Example 7. In each case, soups having an excellent meat flavor or roasted meat flavor are obtained.

EXAMPLE 10

The following ingredients are refluxed for four hours, aged for three days and spray-dried to produce a solid product having a beef flavor. Before drying sufficient gum arabic is added to provide a composition containing 0.5 parts gum arabic and 1 part flavor solids.

| | Parts |
|---|---|
| 2,2'-bis-(thienyl) disulfide | 0.001 |
| L-cysteine hydrochloride | 1.32 |
| Carbohydrate-free vegetable protein hydrolysate | 44.049 |
| Thiamine hydrochloride | 1.32 |
| Beta alanine | .50 |
| Water | 53.31 |

EXAMPLE 11

The following ingredients are refluxed for four hours, aged three days and spray dried to produce a dried product having a beef flavor:

| | Parts |
|---|---|
| 3,3'-bis-(thienyl) disulfide | .01 |
| Water | 53.73 |
| Dibasic ammonium phosphate | 1.06 |
| Thiamine hydrochloride | .63 |
| L-cysteine hydrochloride | .27 |
| Potassium chloride | .27 |
| Phosphoric acid (85%) | .21 |
| Dibasic potassium phosphate | .21 |
| Calcium lactate | .10 |
| Salt | 5.30 |
| Beef fat | 21.20 |
| Carbohydrate-free vegetable protein hydrolysate | 17.54 |

EXAMPLE 12

The following ingredients are refluxed for two hours and thereafter sufficient gum arabic added to provide a composition containing two parts gum arabic and one part flavor solids by weight. The composition is spray dried to produce a dry product with a flavor resembling that of chicken.

| | Parts |
|---|---|
| 2,2'-bis-(thienyl) disulfide | .10 |
| Dibasic ammonium phosphate | .81 |
| Monosodium glutamate | .67 |
| Beta alanine | .67 |
| Glycine | .41 |
| Palmitic acid | .27 |
| Betaine | .27 |
| Ascorbic acid | .14 |
| Choline chloride | .14 |
| Dibasic potassium phosphate | .14 |
| Potassium chloride | .14 |
| Glutamic acid | .28 |
| L-cysteine hydrochloride | .21 |
| Thiamine hydrochloride | .05 |
| Water | 69.70 |
| Pork meat | 26.00 |

EXAMPLE 13

The following ingredients are refluxed for two hours and sufficient gum arabic added to provide a composition containing one part gum arabic and one part flavor solids by weight. The composition is drum dried to produce a dry product with a flavor resembling beef.

| | Parts |
|---|---|
| 2,2'-bis-(thienyl) tetrasulfide | 1.00 |
| L-cysteine hydrochloride | 2.00 |
| Thiamine hydrochloride | 2.00 |
| Water | 66.00 |
| Meat protein concentrate | 29.00 |

EXAMPLE 14

The following ingredients are refluxed for four hours and sufficient gum arabic added to provide a composition containing one part gum arabic and one part flavor solids by weight. The composition is spray dried to produce a product with a flavor resembling that of beef.

| | Parts |
|---|---|
| 2,2'-bis-(thienyl) disulfide | .01 |
| L-cysteine hydrochloride | .88 |
| Thiamine hydrochloride | .88 |
| Water | 66.30 |
| Carbohydrate-free vegetable protein hydrolysate | 30.93 |

EXAMPLE 15

The following ingredients are refluxed for four hours and sufficient gum arabic added to provide a composition containing one part gum arabic and one part flavor solids by weight. The composition is spray dried to produce a product with a flavor resembling that of chicken.

| | Parts |
|---|---|
| 2,2'-bis-(thienyl) disulfide | .01 |
| L-cysteine hydrochloride | .72 |
| Thiamine hydrochloride | .88 |
| Water | 67.45 |
| Carbohydrate-free vegetable protein hydrolysate | 30.93 |

What is claimed is:

1. An edible composition comprising an ingestibly acceptable flavoring adjuvant and a bis-(thienyl) sulfide having a sulfide linkage containing from 2 to 4 sulfur atoms, said sulfide being present in amounts sufficient to alter the flavor of said flavoring adjuvant.

2. A composition according to claim 1, wherein said sulfide has the formula:

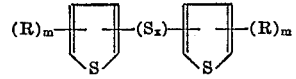

wherein R represents hydrogen or lower alkyl of 1 to 5 carbon atoms, $m$ represents an integer of 1 to 3 inclusive and X represents an integer of 2 to 4 inclusive.

3. A composition according to claim 1, wherein said flavoring adjuvant comprises a thickener, stabilizer, surface active agent, conditioner, flavoring intensifier or flavorant.

4. A composition according to claim 3, wherein said sulfide is present in amounts ranging from .0001% to 1.0% by weight of total composition.

5. A composition according to claim 1, wherein said flavoring adjuvant comprises a foodstuff.

6. A composition according to claim 5, wherein said sulfide is present in amounts ranging from about 1.0 part per billion to 500 parts per million by weight of total composition.

7. A composition according to claim 1, wherein said sulfide comprises 2,2-bis-(thienyl) tetrasulfide.

8. A composition according to claim 1, wherein said sulfide comprises 3,3'-bis-(thienyl) disulfide.

9. A composition according to claim 1, wherein said sulfide comprises 2,2'-bis-(thienyl) disulfide.

10. A process for altering the flavor of a food which comprises incorporating therein a small but effective amount of a bis-(thienyl) sulfide having a sulfide linkage containing from 2 to 4 sulfur atoms.

11. A process according to claim 10, wherein said sulfide has the formula:

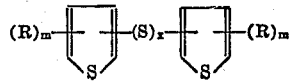

wherein R represents hydrogen or lower alkyl of 1 to 5 carbon atoms, $m$ represents an integer of 1 to 3 inclusive and X represents an integer of 2 to 4 inclusive.

12. A process according to claim 10, wherein said sulfide comprises 2,2'-bis-(thienyl) tetrasulfide.

13. A process according to claim 10, wherein said sulfide comprises 3,3'-bis-(thienyl) disulfide.

14. A process according to claim 10, wherein said sulfide comprises 2,2'-bis-(thienyl) disulfide.

References Cited

UNITED STATES PATENTS

| | | | |
|---|---|---|---|
| 2,544,294 | 3/1951 | Brooks et al. | 260—329 HS |
| 2,571,371 | 10/1951 | Koft | 260—329 HS |

MORRIS O. WOLK, Primary Examiner

W. BOVEE, Assistant Examiner